April 8, 1969           E. C. SUPAN           3,436,806
METHOD OF FORMING AN ALUMINUM-FERROUS TUBULAR TRANSITION JOINT
Filed Jan. 26, 1967
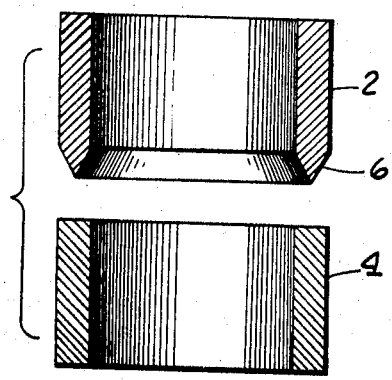
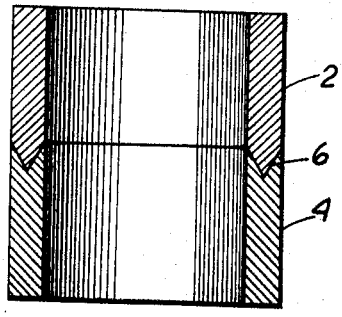
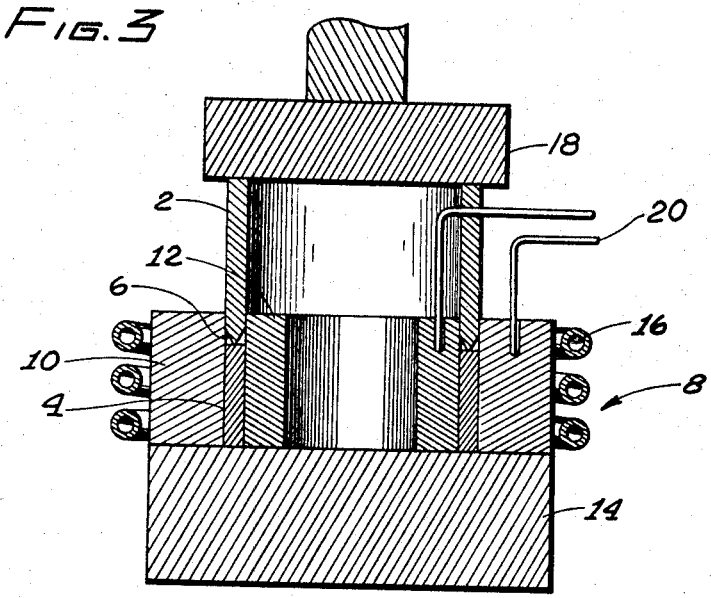
INVENTOR
EDWARD C. SUPAN
By
ATTORNEY

United States Patent Office 3,436,806
Patented Apr. 8, 1969

3,436,806
METHOD OF FORMING AN ALUMINUM-FERROUS TUBULAR TRANSITION JOINT
Edward C. Supan, Northridge, Calif., assignor to North American Rockwell Corporation, a corporation of Delaware
Filed Jan. 26, 1967, Ser. No. 611,901
Int. Cl. B23k *1/20*
U.S. Cl. 29—482      10 Claims

ABSTRACT OF THE DISCLOSURE

The present invention involves a method of forming a joint between members of steel and aluminum. A knife-edge is formed on an edge of the steel member, a thin layer of nickel is deposited on this edge, and a thin layer of tungsten is deposited thereupon. The ferrous and aluminum members are then diffusion-bonded together by applying of a pressure of about 30,000–45,000 p.s.i. in vacuum, at a temperature of about 800-1100° F. for about 1 to 10 minutes, after which the resulting joint is permitted to cool to ambient temperature.

---

The present invention relates to a method of joining aluminum and ferrous members, and more particularly to a method of making an improved, metallurgically sound transition joint between tubular components of aluminum and ferrous base alloys. The present application describes an improvement over the invention claimed in copending application Ser. No. 478,155, filed Aug. 9, 1965, in the names of Warren H. Friske and Edward C. Supan for "Method of Joining Aluminum and Ferrous Members" and assigned to the assignee of the present invention. The invention described in this application was made under a contract with the U.S. Atomic Energy Commission.

Joints between aluminum and ferrous members are required for many applications in apparatus and process systems where the structural and metallurgical properties of both metals are required. The differences between aluminum and steel in strength, fabricability, weight, corrosion resistance, and thermal expansion require that both metals be used together in one system, each for its own characteristics. For example, in a nuclear reactor the process tubes enclosing the fuel elements may be of aluminum or an aluminum alloy because of the low thermal neutron absorption cross section of aluminum, whereas headers, grid plates, or other structural members to which the process tubes are joined will be of steel because of its desirable strength, fabricability, and lower cost. There are also applications of aluminum-steel components in cryogenic systems. High quality joints between aluminum and ferous metals, metallurgicaly sound and leak-tight, are therefore necessary for many current applications.

Conventional brazing and welding methods, however, have not been successful in meeting the strict standards for such joints. Among the basic problems asociated with the fabrication thereof are large stresses at the joint interface due to differences in thermal expansion of the metals, and formation of brittle intermetallic compounds of iron and aluminum by diffusion of aluminum across the joint interface, which may be accompanied by volume expansion and gross cracking. There is therefore need for an improved bonding process for joining ferrous and aluminum members.

As used in the present application and claims, the term "aluminum" includes aluminum metal and alloys having metallic or ceramic components, for example, the commercially available aluminum alloys consisting of about 4-12 weight percent aluminum oxide dispersed in an aluminum matrix. The term "ferrous metal" is intended to designate metals and alloys at least 50 percent of which are iron, and includes the various types of stainless steel.

Accordingly, the principal object of the present invention is to provide an improved method of joining ferrous and aluminum members.

Another object is to provide an improved method of forming such a joint which possesses high strength at elevated temperatures and is leak-tight.

Another object is to provide a method of joining aluminum and ferrous members utilizing an improved, composite diffusion barrier material.

Another object is to provide an improved method of joining aluminum and ferrous metals which does not require the use of welding or brazing techniques.

Still another object is to provide a method of joining aluminum and ferous metals for high temperature applications wherein the formation of britle, intermetallic aluminum and iron compounds is avoided.

A further object is to provide such a method which can be performed relatively quickly and economically and is suitable as a production method.

Other objects and advantages of the present invention will become apparent to those skilled in the art from the following description and the appended claims.

In the drawings,
FIG. 1 is a cross-sectional representation of transition joint components;
FIG. 2 is a cross section of a completed transition joint; and
FIG. 3 is a cross section of an apparatus for fabrication of tubular transition joints.

In accordance with the present invention, aluminum and ferorus members may be joined by forming a tapered edge on the ferrous member, coating said edge first with nickel, followed by tungsten thereupon. The members are then contacted under pressure in an inert environment at an elevated temperature which is below the melting point of any of the joint components. This results in an effective, leak-tight joint through plastic flow of the aluminum over the tapered surface of the ferrous member.

The nickel-tungsten coating upon the ferrous member serves as an effective diffusion barrier to aluminum diffusion into the ferrous member and yields a consistently high strength, high temperature, helium leak-tight joint. The tungsten is an unexpectedly high quality diffusion barrier, even at elevated temperatures and in a hydrogeneous medium such as a hydrocarbon organic reactor coolant, where other potential diffusion barriers might form hydrides and become brittle. The nickel, however, which itself is a poorer diffusion barrier than tungsten, is more adherent to tungsten than is a ferrous material. Thus, the nickel is adherent to and compatible with both the tungsten and the ferrous material and serves as an effective interleaf between the otherwise insufficiently adherent tungsten and ferrous materials.

The diffusion bonding operates by plastic deformation or flow of the aluminum over the tapered surface of the ferrous member. At appropriate bonding pressures and temperatures, a clean aluminum surface is exposed at the joint interface free of surface contamination, which significantly contributes to the formation of the high quality bond. The surface of the contacting edge of the ferrous member is tapered to a cross section width less than that of the cross section of the associated joining surface of aluminum, and the taper preferably extends to a knife-edge. There are several advantages of the tapered edge: the aluminum surface is penetrated easier which exposes the fresh aluminum surface, and aluminum flow along the tapered edge facilitates union of steel and aluminum.

For further details concerning the present invention, reference is made to FIG. 1 which shows steel and aluminum transition joint components 2 and 4 prior to joining. The steel member has a double knife-edge 6 with about a 60–75° angle to the edge from the horizontal; knife-edges with other angles may be appropriately used. In FIG. 2 is seen a completed transition joint with plastically deformed aluminum bonded to the ferrous member.

It is essential that the ferrous member rather than the aluminum member be coated with the nickel-tungsten, because in the hot pressing step the aluminum must be deformed and flow about the ferrous member knife-edge to give the resulting joint. Coating the aluminum with the nickel-tungsten would prevent such flow. The tungsten functions as a diffusion barrier, preventing contact between the aluminum and steel to avoid formation of iron-aluminum intermetallics. Further, there is no eutectic or other compound formation between the tungsten and the aluminum, nor is there evidence of degrading interdiffusion after prolonged testing at elevated temperatures.

The nickel is first applied on the knife-edge bonding surface of the ferrous member. Although various conventional methods may be employed, it is preferred to apply a thin coating of nickel by electroplating, for example about 0.2–2.0 mils, with about 0.3–0.5 mil being preferred. Prior to coating, the bonding surface of the ferrous member is desirably roughened, for such improves adherence of the nickel electroplate; this may be conveniently done by chemical etching or grit blasting. The nickel-plated ferrous member is then vacuum outgassed at a temperature of about 650–750° C. at a pressure no greater than about $5 \times 10^{-4}$ torr in order to prevent outgassing during the subsequent operation of applying tungsten, which would interfere therewith.

The tungsten is then applied onto the nickel-coated ferrous member by any of a variety of conventional coating techniques, such as chemical vapor deposition, vacuum deposition from an electron beam-heated tungsten source, or electroplating in a high temperature molten salt bath. Of these, vapor deposition has been found to be a convenient and economical method of applying the tungsten coating. For example, a thin coating of tungsten may be deposited onto the nickel-plated ferrous member at a temperature of about 490–540° C. by reduction of gaseous tungsten hexafluoride in hydrogen at a reduced gas pressure of about 2.0–4.5 in. Hg, according to the following reaction:

$$WF_6 + 3H_2 \rightarrow W + 6HF$$

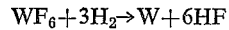

The deposition reaction may be made to take place at the knife-edge bonding surface of the ferrous member by locally heating such surface in a high frequency induction coil. Satisfactory tungsten coating thicknesses on the nickel range from about 0.2–2.0 mils, while an optimum coating is about 0.5–1.0 mil.

The aluminum and the nickel-tungsten coated ferrous surfaces are joined by hot pressing at elevated temperatures using conventional equipment. The joint components are prepared for bonding by degreasing the surfaces, roughening the steel knife-edge, and abrading the aluminum joint area by such means as abrasive paper or a wire brush. Following this, the parts are rinsed in acetone, alcohol, or the like, and the diffusion barrier materials applied onto the steel knife-edge, as heretofore described. The joint members are next placed in a fixture which maintains conformity of the surfaces, and pressure is applied at temperature.

The temperature, pressure, and time parameters may satisfactorily vary over a considerable range and are coordinated in that higher pressures or temperatures may compensate for shorter times and vice versa. The particular conditions are dependent to some measure upon the properties of the particular aluminum and ferrous members. For example, aluminum metal or a low strength aluminum alloy may be bonded to steel at a lower temperature and/or pressure than higher strength aluminum alloys. As a general case, it is found that the temperature may satisfactorily be about 800–1100° F., under loads of at least about 30,000–45,000 p.s.i. of cross section of the aluminum member in a nontapered section, about 37,000 p.s.i. being preferred, for a period of time of about 1 to 10 minutes.

The preferred temperature for hot pressing is dependent upon the strength of the aluminum, and is one which causes sufficient aluminum plastic deformation and consequent flow during bonding of aluminum to the tapered ferrous member. For example, $Al_2O_3$-containing aluminum alloys such as XAP001 are bonded in the range of about 950–1100° F. Such other common commercial aluminum alloys as type 6063 may be bonded as low as about 800° F. There is no actual melting of the aluminum, however, and the upper bonding temperature is below that which gives a eutectic between aluminum and tungsten, for it is not desirable to have a liquid phase, such as one would have from a eutectic.

The resulting joined member may then be directly taken to ambient conditions, for example by removing the members from under load into ambient air. However, while no special cooling regime is necesary after the bond is formed and no deleterious effects have been noted, it is preferred to slowly cool the joint under load to a temperature of no higher than about 600° F., to minimize any cracking due to stresses at the bond interface due to differences in expansion coefficients. The joint is then removed from the fixture and permitted to air cool to ambient temperature. For example, the joint may be cooled at a rate of about 10° F. per minute to 300° F., and preferably at a rate of about 5° F. per minute to room temperature. The hot pressing is conducted in a manner to avoid oxidation of the joint interface. This ordinarily requires that the joining be conducted in an inert atmosphere such as is provided by an inert gas such as argon or preferably in vacuum. However, if the joint interface is assembled in such a leak-tight manner as to prevent oxidation of the ferrous member, the joining might be performed in air.

An apparatus for fabrication of tubular transition joints between ferrous and aluminum tubular members is shown in FIG. 3. The ferrous and aluminum joint components 2 and 4 are placed in a hot pressing apparatus 8, and are radially restrained by an outer die 10 and an inner mandrel 12 positioned on a die base 14. The die set is fabricated from hardened high-speed tool steel (AISI type T1 or the like). The assembly is heated by an induction coil 16 surrounding the die, and bonding pressure is applied by a hydraulic press 18 acting vertically on stainless steel tube 2. Thermocouples 20 are positioned in die 10 and mandrel 12 to provide temperature control during hot pressing. This apparatus is positioned in a retort (not shown) which provides the controlled atmosphere. The retort is flushed with argon and evacuated by a mechanical vacuum pump prior to the hot pressing operation.

The following example is offered to illustrate the present invention in greater detail.

*Example*

An aluminum alloy tube containing approximately 6 percent $Al_2O_3$ dispersed in an aluminum matrix (sold under the trade name XAP001 by the Aluminum Company of America) was extruded, having the dimensions 4.398 in. OD. by 3.982 in. I.D. by 3 in. in length. A similar size type 347 stainless steel tube had double knife-edges machined at one end of the tube at an angle of 60° from the horizontal. The joint components were prepared for bonding by degreasing, liquid honing the stainless steel knifeedge, and abrading the aluminum joint area, following which the parts were rinsed in alcohol.

A 0.3-mil nickel coating was electroplated onto the knife-edge from a nickel chloride-hydrochloric acid bath, the unplated portion of the ferrous member being covered with a masking tape about 1/16 in. above the knife-edge surfaces. After a nickel strike of about 6–7 minutes the member was removed and rinsed with tap water, followed by distilled water and methyl alcohol rinses.

The nickel-coated steel member was placed in a reaction chamber and the chamber evacuated to a pressure no greater than about $5 \times 10^{-4}$ torr. It was then induction heated to a temperature of 650–700° C. for two minutes, and the reaction chamber back-filled with hydrogen to a pressure of 3 in. Hg at a temperature of about 520° C. Tungsten hexafluoride and hydrogen were admitted into the reaction chamber for about 2–3 minutes while the pressure was maintained therein. The tungsten hexafluoride was metered at room temperature through a nominal 0.04-in. orifice with a 0.4–0.6-in. Hg differential pressure across the orifice. The flow of tungsten hexafluoride and hydrogen was then shut off and the pressure reduced in the reaction chamber to no greater than 15 microns. When the temperature of the components in the reaction chamber reached about 150° C., the chamber was vented and the members removed therefrom. A tungsten coating of about 1.0 mil was deposited by this procedure.

The tubular components were next placed in the hot pressing apparatus shown in FIG. 3 and were bonded together under vacuum at a temperature of 1025° F. under a pressure of 37,000 p.s.i. of aluminum tube cross section for 5 minutes. The joint was cooled under load to about 600° F. in the retort at a rate of about 5° F. per minute, removed from the retort, and allowed to cool to room temperature. The joint was then machined on the diameters to 4.375 in. O.D. by 4.000 I.D. which facilitated dye penetrant testing to ensure high joint integrity.

Testing and evaluation of the resulting aluminum-alloy-stainless steel transition joint with the composite nickel-tungsten diffusion barrier were based upon determination of leak-tight integrity, long-term isothermal heat treatments, thermal cycling, tensile testing, and metallographic examination of joint cross sections.

Isothermal heat treatments were conducted in an air or vacuum atmosphere at a temperature of 950° F. for times up to about 1000 hours, in order to determine the extent and effect of any diffusion interaction at the joint interface. No tungsten-aluminum intermetallic formation resulted. Thermal cycling 10,000 times between 650–750° F. did not produce any deleterious effects on the strength and leak-tight integrity of the joint. Helium leak tightness was demonstrated to the full sensitivity of a leak detector apparatus (less than $10^{-10}$ STD cc./second). Dye penetrant tests showed no joint defects.

Tensile strengths were conducted at room temperature and 750° F. on the full cross sections of the transition joints. For loads ranging between about 81,000–83,000 lbs., ultimate tensile strengths of about 33,000–34,500 p.s.i. were obtained. At a temperature of about 750° F. with loads ranging between about 20,000–26,000 lbs., ultimate tensile strengths of about 10,000–11,000 p.s.i. were recorded.

Metallographic examination of the joint cross section in the as-bonded condition and after various thermal treatments showed intimacy of contact at the bond interface between the stainless steel and aluminum alloy members, and no tungsten-aluminum intermetallic formation.

In conclusion, testing of the joints showed that high quality, strong, leak-tight bonds were established which withstood thermal cycling and isothermal heat treatments for extended periods. The suitability of such stainless steel-aluminum joints for service under severe environmental conditions was thus established.

The foregoing examples are illustrative rather than restrictive of the present invention. Various changes in procedural techniques and the like may be made by those skilled in the art without departing from the spirit of the present invention, which should be understood to be limited only as is indicated in the appended claims.

I claim:
1. A method of joining an aluminum member and a ferrous member at corresponding edges, which comprises:
   (a) providing a tapered edge on the ferrous member,
   (b) coating said tapered edge first with a thin layer of nickel and then with a thin layer of tungsten thereupon,
   (c) contacting the resulting coated tapered edge of the ferrous member with a corresponding flat edge of the aluminum member, and
   (d) heating said contacting edges of said members at an elevated temperature below the fusion temperature of said members while applying sufficient pressure thereto for said coated tapered edge to penetrate said flat edge and while excluding air from the joint interface,
   (e) said temperature and said pressure being sufficient to cause flow of the aluminum over said tapered edge to form a high strength substantially leak-tight bond between said members at their contacting edges.

2. The method of claim 1 wherein said bonding is performed at a temperature of about 800–1100° F.

3. The method of claim 1 wherein said bonding is performed at a pressure of about 30,000–45,000 p.s.i. of aluminum cross section.

4. The method of claim 1 wherein said pressure is maintained for a period of about 1–10 minutes.

5. The method of claim 1 wherein said nickel is electroplated onto said ferrous member and said tungsten is vapor deposited thereupon.

6. The method of claim 1 wherein said nickel coating is about 0.2–2.0 mils and said tungsten coating is about 0.2–2.0 mils.

7. The method of claim 1 wherein said bonding is performed at a temperature of about 800–1100° F., under a load of about 30,000–45,000 p.s.i. of aluminum cross section, for a period of about 1–10 minutes in an inert atmosphere.

8. A method of forming a joint between tubular members of steel and an aluminum alloy consisting essentially of about 4–12 weight percent $Al_2O_3$ distributed in an aluminum matrix, which comprises:
   (a) providing a knife-edge on one end of said steel tube,
   (b) electroplating upon said knife-edge a layer of about 0.3–0.5 mil of nickel,
   (c) vapor depositing a layer of about 0.5–1.0 mil of tungsten upon the nickel plating of the steel tube,
   (d) contacting the resulting knife-edge of steel with the aluminum member,
   (e) bonding said contacting members together in vacuum at a temperature of about 950–1100° F. under a load of about 30,000–45,000 p.s.i. for about 1 to 10 minutes,
   (f) and then cooling the resulting joint to the ambient atmospheric temperature.

9. The method of claim 8 wherein said bonding is conducted at a temperature of 1025° F. under a load of about 37,000 p.s.i. for about 5 minutes.

10. The method of claim 8 wherein the joint is slowly cooled under said load to a temperature no higher than about 600° F., whereafter the load is removed and the joint permitted to cool to ambient atmospheric temperature without further temperature and pressure adjustments.

References Cited
UNITED STATES PATENTS

| | | | |
|---|---|---|---|
| 2,535,397 | 12/1950 | Duch | 29—501 X |
| 2,763,058 | 9/1956 | McCullough | 29—497.5 X |
| 2,790,656 | 4/1957 | Cook. | |
| 2,809,422 | 10/1957 | Schultz | 29—497.5 |
| 2,908,073 | 10/1959 | Dulin | 29—498 X |
| 2,917,818 | 12/1959 | Thomson | 29—196.2 |
| 3,292,256 | 12/1966 | Morgan | 29—501 X |
| 3,367,020 | 2/1968 | Watson | 29—475 |

JOHN F. CAMPBELL, Primary Examiner.

R. F. DROPKIN, Assistant Examiner.

U.S. Cl. X.R.

29—196.6, 197, 487, 494, 497.5, 498, 504